May 7, 1935. M. J. HANLON 2,000,839
AUTOMATIC HATCH BEAM LOCKING DEVICE
Filed July 3, 1934 2 Sheets-Sheet 1
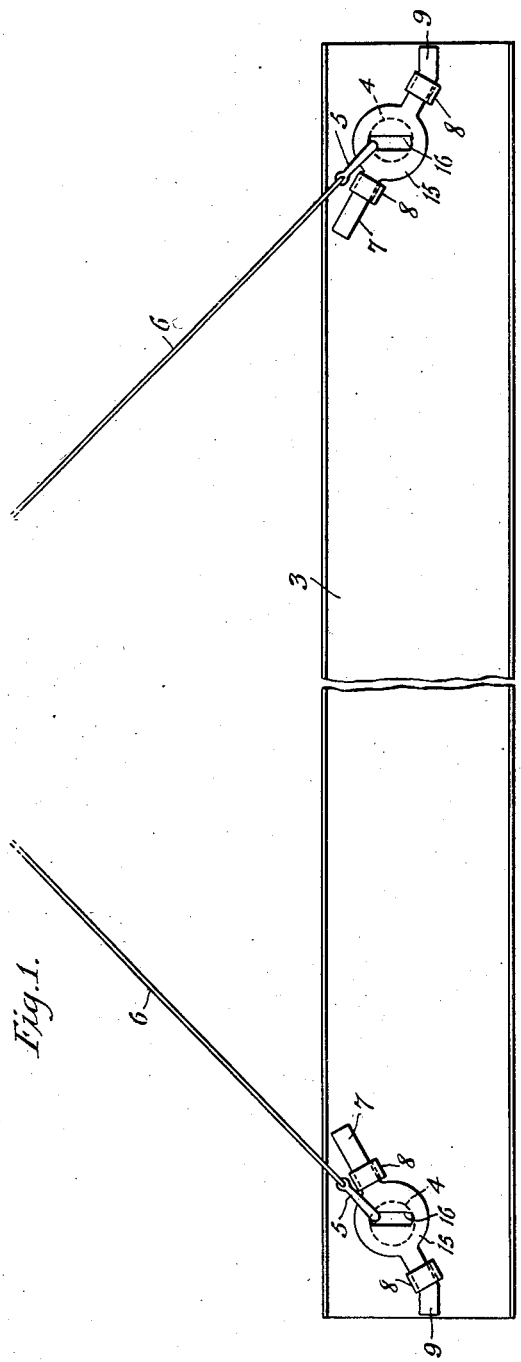
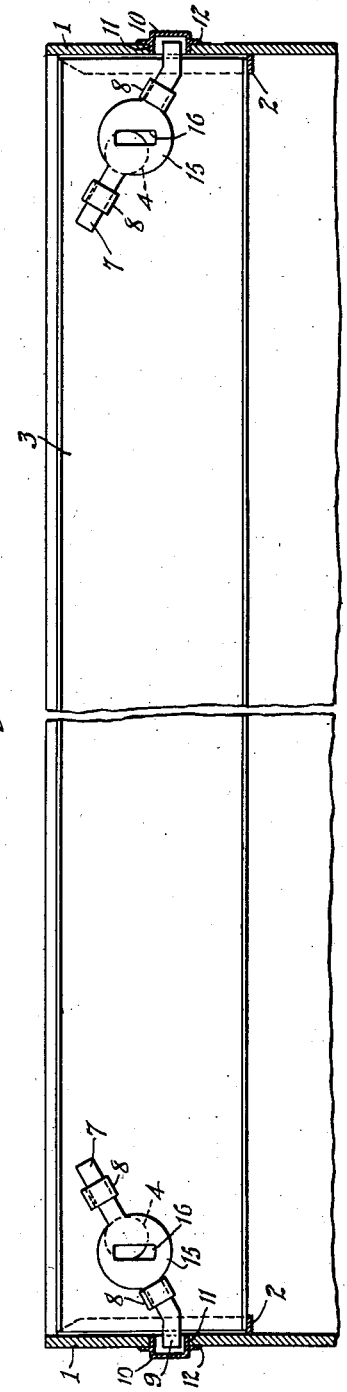
WITNESSES
Edw. Thorpe
S. W. Porter
INVENTOR
Michael J. Hanlon
BY
Munn, Anderson & Liddy
ATTORNEYS May 7, 1935.    M. J. HANLON    2,000,839
AUTOMATIC HATCH BEAM LOCKING DEVICE
Filed July 3, 1934    2 Sheets-Sheet 2

WITNESSES
Edw. Thorpe
S. W. Foster

INVENTOR
Michael J. Hanlon
BY
Munn, Anderson & Leddy
ATTORNEYS

Patented May 7, 1935

2,000,839

UNITED STATES PATENT OFFICE 2,000,839

AUTOMATIC HATCH BEAM LOCKING DEVICE

Michael J. Hanlon, Weehawken, N. J., assignor to Black Diamond Steamship Corporation, New York, N. Y., a corporation of Delaware Application July 3, 1934, Serial No. 733,674

8 Claims. (Cl. 114—203)

This invention relates to automatic hatch beam locking devices, an object of the invention being to provide a hatch beam with locking devices which are automatic in their action, that is to say, they move by gravity to locking position and are moved to unlocking position by the engagement therewith of lifting hooks employed to handle the hatch beam.

A further object of my invention is to provide a hatch beam with automatic locking devices to prevent the accidental dislodging of the heavy steel portable beams in the weather deck, and between deck cargo hatches of vessels, with attendant danger of serious personal injury or damage to the vessel or its cargo.

This device is so designed and constructed that the act of lifting the hatch beam either from the deck or out of its location in the hatch coaming automatically withdraws and releases the heavy steel locking bars, and immediately the hatch beam is lowered into position in the hatch coaming the locking bars which are set in an angular position automatically engage a slot or opening in the hatch coaming and forms a positive lock preventing the accidental lifting or dislodging of the hatch beam. The principle of operation is based on the fact that the lifting hooks employed to handle the hatch means are engaged in slots provided in the locking bars and as power is applied by the derrick or a crane the angularity of the locking bars and the wire or chain span lifting gear automatically withdraws the locking bars, thus releasing the hatch beam from its locked condition and permitting it to be placed in any desired location.

The locking bars are constructed with a large disk section in the midlength, the purpose of which is three-fold: First, to provide a weight or mass which due to the angular position in which the locking bars are fitted always moves the locking bars into the outward or locked position by the force of gravity. Second, it provides a slot into which the hooks of the lifting gear are placed thus automatically returning the locking bar to the open position when the hatch beam is lifted. Third, it provides a disk cover for the original lifting hole in the hatch beam rendering it impossible to lift the hatch beam by any means other than the slot provided in the locking bars for that purpose.

The locking bars are steel castings of the form and size shown on the accompanying drawings, and are fitted one on each end of each hatch beam and an easy sliding fit in steel clips electrically welded to the web of the hatch beam.

The device is simple, inexpensive and rugged. No pins, joints, springs, pawls or parts liable to be damaged or deranged are employed. The hatch beams when fitted with this device are reversible and interchangeable.

With these and other objects in view, the invention consists in certain novel features of construction and combinations and arrangements of parts, all of which will be more fully hereinafter described and pointed out in the claims.

Figure 1 is a broken view in elevation illustrating a hatch beam equipped with my improved locking devices, held in unlocked position by the action of the lifting hooks of the lifting gear;

Figure 2 is a view in section through the hatch coaming showing the beam in position and the locking devices in locked position;

Figure 3:
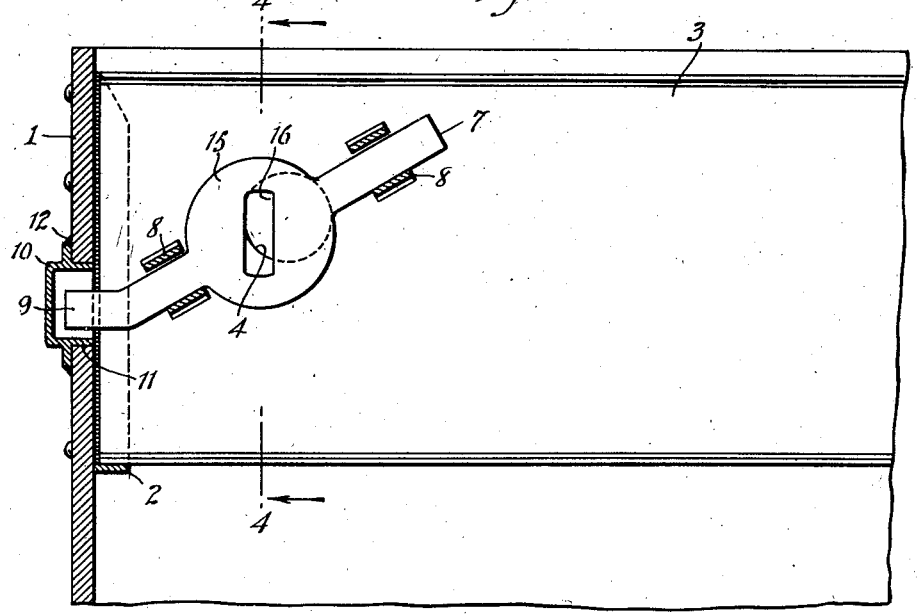
Figure 3 is an enlarged fragmentary sectional elevation.
Figure 4:
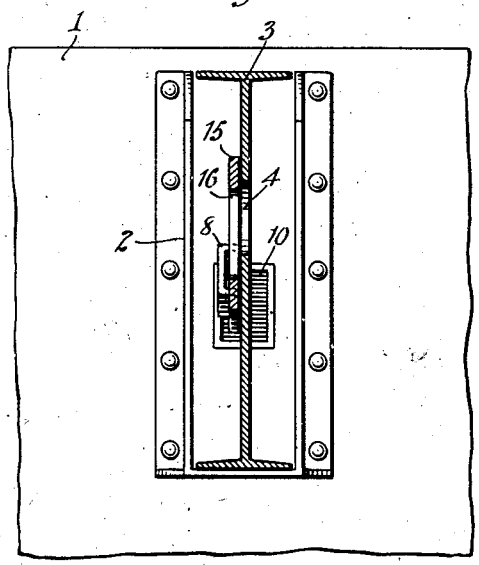
Figure 4 is a view in transverse section on the line 4—4 of Figure 3.
Figure 5:
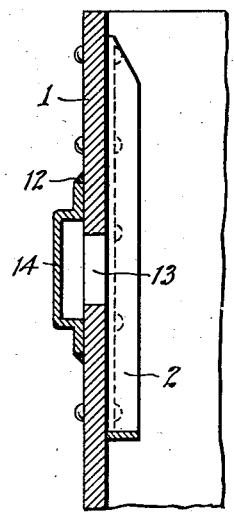
Figure 5 is a fragmentary view in section illustrating a modification.

1 represents a hatch coaming to the inner face of which stirrups 2 are secured and are adapted to receive the ends of the hatch beam 3. The hatch beam 3 is preferably of steel and constitutes an ordinary I-beam, or may be fabricated of steel plates, angles, or rolled shapes riveted together to form a hatch beam, and is provided adjacent its ends with openings 4 for the reception of hooks 5 connected to wires, cables, or chains 6 of span lifting gear operated by a derrick or crane, not shown. At both ends of the beam 3 I provide locking bars 7 and these locking bars 7 are mounted to slide freely in clips 8 welded to the beam and are disposed at a sufficient angle so that they move downwardly by gravity. The lower ends of the locking bars 7 are substantially horizontal, that is they are substantially parallel to the longitudinal edges of the beam and constitute locking bolts 9 which are adapted to project into keepers 10 secured in the coaming 1. These keepers may constitute boxes, as indicated in Figures 2, 3 and 4 of the drawings, which are secured in openings 11 in the coaming, and have flanges 12 which are welded to the outer face of the coaming so that these box-like keepers form a water-tight closure for the openings. The keepers, however, may constitute merely an opening 13 in the coaming, with a metal cap or cover 14 welded to the outer face of the coaming and covering the same, as shown in Figure 5 of the drawings. This manner of protecting the bolt-receiving openings from the inflow of water is desirable on the decks which are exposed to water but are not necessary in other places.

The locking bars 7 intermediate their length are formed with enlargements or disks 15 which cover the hook-receiving openings 4 of the beams. These disks 15 have slots 16 therein through which the hooks 5 must be projected to engage in the openings 4. In other words, it is impossible to position the hooks 5 in lifting engagement with the openings 4 without projecting them through the slots 16 of the disks 15, and when the hooks are so positioned, by reason of the fact that pull on said hooks is an angular one as shown clearly in Figure 1 of the drawings, the first operation of lifting is to draw the locking bars to their elevated unlocked position. When the beam is lowered into the position in the stirrups and the strain on the hooks is relieved, the locking bars will move by gravity to their locking position. Thus, the operation of locking and unlocking is entirely automatic, as it is impossible to lift the beam without unlocking the same, and it is impossible to properly position the beam in the stirrup without the locking mechanism automatically moving to locked position.

While I have illustrated what I believe to be the preferred embodiment of my invention it is to be distinctly understood that various slight changes may be made with regard to the form and arrangement of parts without departing from my invention, and hence I do not limit myself to the precise details set forth but consider myself at liberty to make such changes and alterations as fairly fall within the spirit and scope of the claims.

What I claim is:

1. The combination with a hatch beam having hook receiving openings therein, of automatic locking devices at the ends of the beam covering the openings, said locking devices moved to unlocking position by the action of lifting hooks in the openings engaging the beam.

2. The combination with a hatch beam having hook receiving openings therein, of automatic locking devices at the ends of the beam covering the openings, said locking devices moved to unlocking position by the action of lifting hooks in the openings engaging the beam, said locking devices angularly disposed relative to the beam and moved by gravity to locking position.

3. The combination with a hatch beam, of locking bars located at both ends of the beam and disposed at an angle to the beam, and adapted when in their lowered position to project beyond the ends of the beam into locking position, clips on the beam receiving the bars and permitting free movement of the bars, said beam having hook-receiving openings therein, enlargements on the bars covering the openings and having hook-receiving slots therein, said enlargements engaging the lower clips and limiting the downward movement of the bars.

4. In combination with a hatch beam having a hook-receiving opening therein, a locking bar angularly disposed relatively to the beam, means mounting the bar on the beam and permitting the bar to move by gravity to locking position, an enlargement on the bar covering the opening in the beam, and a hook-receiving slot in the enlargement so located with relation to the opening in the beam that when the hook is projected through said slot and opening the lifting strain on said hook will cause the locking bar to be moved to unlocking position and the release of the strain on said hook will permit the locking bar to move by gravity to locked position.

5. The combination with a hatch coaming, stirrups secured to the inner face of the coaming, a hatch beam adapted to engage the stirrups and having openings adjacent its ends, locking bars mounted on the beam at its ends, said bars angularly disposed and adapted to move by gravity to project the lower ends of said bars into openings in the coaming, integral disk-like enlargements on the bars covering the openings in the beam, and slot-receiving hooks in the disks so positioned with relation to the opening that when angular lifting strain on the hook is had such movement of the hook will move the locking bars to unlocked position before any lifting strain can be had upon the beam.

6. The combination with a hatch coaming, stirrups secured to the inner face of the hatch coaming, a hatch beam adapted to enter the stirrups and having hook receiving openings therein, locking bars having sliding engagement with the beam covering the openings in the beam and angularly disposed so that they move to locking position by gravity, said locking bars having openings to receive projected through the openings in the beam, lifting hooks, said openings so arranged that the action of the lifting hooks moves the locking bar to unlocked position.

7. The combination with a hatch coaming, stirrups secured to the inner face of the hatch coaming, the hatch beam adapted to enter the stirrups, locking bars having sliding engagement with the beam and angularly disposed so that they move to locking position by gravity, said beam and locking bar having openings to receive a lifting hook said locking bar covering the opening in the beam, said openings so arranged that the action of the lifting hook when positioned in the opening in the beam moves the locking bar to unlocked position, said coaming having openings therein, and box-like keepers secured in said openings preventing entrance of water into the hatch through said openings and functioning as keepers to receive the ends of the locking bars.

8. The combination with a hatch beam having hook receiving openings adjacent its ends, of locking bars at the ends of the beam moved by gravity to locked position, said locking bars having openings therein so that when hooks are projected through the openings in the beam and through the openings in the locking bar and lifting strain is applied to the hooks the bars will be moved to unlocked position when the beam is elevated.

MICHAEL J. HANLON.